(12) United States Patent
Wang et al.

(10) Patent No.: US 8,830,475 B1
(45) Date of Patent: Sep. 9, 2014

(54) INTERFEROMETER AND SPATIAL INTERFERENCE FOURIER TRANSFORM SPECTROMETER

(71) Applicant: National Cheng Kung University, Tainan (TW)

(72) Inventors: Wei-Chih Wang, Tainan (TW); Benjamin Estroff, Tainan (TW); Chih-Han Chang, Tainan (TW); Fong-Chin Su, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/969,634

(22) Filed: Aug. 19, 2013

(51) Int. Cl.
*G01J 3/45* (2006.01)
*G01B 9/02* (2006.01)

(52) U.S. Cl.
CPC .............. *G01B 9/02015* (2013.01); *G01J 3/45* (2013.01)
USPC ....................................................... 356/451

(58) Field of Classification Search
CPC .................. G01J 3/02; G01J 3/45; G01J 9/02; G01J 3/4531; G01J 3/453; G01N 2021/3595; G01N 21/45; G01B 9/02; G01B 11/0675; G01B 9/02027
USPC ............. 356/451, 450, 326, 445; 250/339.08, 250/339.07
See application file for complete search history.

(56) References Cited

U.S. PATENT DOCUMENTS

| | | | |
|---|---|---|---|
| 2004/0109162 A1* | 6/2004 | Naya | 356/445 |
| 2012/0062901 A1* | 3/2012 | Yoshida et al. | 356/479 |
| 2014/0152993 A1* | 6/2014 | Hirao, Yusuke | 356/451 |

\* cited by examiner

*Primary Examiner* — Tarifur Chowdhury
*Assistant Examiner* — Mohamed Amara
(74) *Attorney, Agent, or Firm* — Bacon & Thomas, PLLC

(57) ABSTRACT

Disclosed is an interferometer comprising a light source, a reflective element, and a photodetector. The light source is configured to emit a light beam, and an angle is formed by inclusion between a direction to which the light beam travels and the reflective element, the photodetector is configured to be substantially perpendicular to the reflective element. The light beam is halved into a first light beam propagating by the included angle, and a second light beam reflected off the reflective element, the first light beam and the second light beam interfere each other to form an interferogram on the photodetector, which detects the interferogram. By benefit of above, the interferometer does not need to reposition its parts in order to make adjustment to interferogram, thereby simplifying optical element setup and minimizing physical volume of the interferomger. Also disclosed is a spectrometer including the same interferometer and a Fourier-transform-capable analyzer.

20 Claims, 3 Drawing Sheets

INTERFEROMETER AND SPATIAL INTERFERENCE FOURIER TRANSFORM SPECTROMETER

FIELD OF INVENTION

The present invention relates to an interference device, particularly to an interference device requiring no displacement for any part thereof, and provides a spectrometer having the interference device thereof.

DESCRIPTION OF RELATED ART

Fourier transform spectroscopy (FTS) is today's one of the most widely used analysis tools for chemical and biological analysis. The choice of FTS is usually a result of the following considerations: (1) by design it is possible to create interference with fewer light source elements and without slits, thereby avoiding losses of photo-radiation intensity, resulting in an interferogram with significantly greater intensity at the detector than is possible with a scattering device, and a higher signal/noise ratio; (2) high resolution and wavelength reproducibility are achievable; (3) a full spectrum analysis can be obtained in a brief period of time (usually less than 1 second) (after the light beam produced by a light source element has progressed through an optical path, it can arrive at the light detector at the same time).

After Digilab became the first to sell portable Fourier transform spectrometers in 1969, infrared Fourier transform spectrometry has become a fundamental tool in science and technology research. To achieve the high resolution required for laboratory research, typical Fourier transform spectrometers are bulky and cumbersome to accommodate the mechanisms necessary for precise control of a micromechanical scanning mirror. However, not all applications in experimental research require high resolution, such as blood analysis, petroleum quality control, color measurement, etc., and for these applications, the top priorities for a Fourier transform spectrometer are its portability and cost.

Recently, several researchers have been focusing on the development of a compact spectrometer using different (primarily microelectromechanical [MEMS]) technologies. For example, Manzardo has developed a lamellar grating-based spectrometer achieving a 5.5 nanometer (nm) resolution at a 800 nm wavelength, Solf has utilized LIGA technology to create a Fourier transform spectrometer with a 24.5 nm resolution at a 1545 nm wavelength, and Ataman has developed a lamellar grating spectrometer utilizing magnetically actuated polymer. However, designs for miniature spectrometers using MEMS technology are very demanding in terms of the quality for each optical element; for example, an optical grating requires extremely smooth side walls, which is difficult to manufacture, and the side wall thickness is limited by the capabilities of the manufacturing technique. In this way, manufacturing the aforementioned micro-spectrometers can become prohibitively expensive. Furthermore, the moving parts of the currently known compact spectrometers tend to be very sensitive to environmental disturbances, limiting where they can be deployed and increasing the need for insulation from the environment.

Accordingly, in the interest of pursuing improvement, the inventor has developed a low-cost, compact interference device and a spectrometer using the interference device thereof.

SUMMARY OF THE INVENTION

A main objective of the present invention is to provide an interferometer without moving parts, which simplifies the optical elements of an interferometer to minimize the device volume, and effectively reduce the costs for materials and construction.

In order to achieve the above objective, the present invention provides an interferometer requiring minimal spatial volume by providing a light source element, a reflective element, and a photodetector. The light source element is configured to emit a light beam; the reflective element has a surface, wherein a travel direction of the light beam and the surface of the reflective element form an included angle $\theta$; and a photodetector, which is disposed to be substantially perpendicular to the reflective element, and is used in detecting light signal. The light beam is halved by the reflective element into a first light beam travelling by the included angle $\theta$ and a second light beam reflected off the surface of the reflective element. The first and second light beams intersect at an angle $\Phi$ (substantially $\Phi = \sim 2\theta$) to form an interferogram on the photodetector; the photodetector detects the interferogram and relays the interferogram as an electrical signal.

In following the conditions of the above, the present invention presents an interferometer without moving parts, requiring only a few optical elements to create an interferogram. This setup can reduce the number of optical elements in an interferometer, and therefore minimize the interferometer's size and complexity of manufacture.

On the account that the interferometer of the current invention requires no repositioning of its parts, it should be understood to a person of average skill that this design does not require movable components to generate an optical path difference (OPD), unlike a Michelson interferometer, which utilizes reciprocal motion of mechanical components to generate the OPD. As the OPD in this case is made by the structural design of the components, the time needed for the photodetector to detect light signal is greatly reduced, enabling real-time procurement of time-series light signals from the interference pattern.

The light beam used in this invention can be a monochromatic light beam, characterized by a certain wavelength $\lambda$, and the interferogram can comprise numerous interference fringes, which have a spatial frequency of $v_s = 2 \sin \theta / \lambda$. On another level of managing these parameters, the angle included by the surface of the reflective element can be changed by controlling the light beam's propagation direction, and the spatial frequency of the multiple interference fringes can ultimately be controlled.

Furthermore, the light beam can be a collimated light beam, a diverging light beam, or a converging light beam. Preferably, the light beam is a collimated light beam.

The photodetector of the current invention can be a charge-coupled device (CCD) or a complementary metal oxide semiconductor (CMOS); the photodetector is preferred to be a charge-coupled device.

In addition, the photodetector can be an optical sensor array, preferably, the photodetector is a two-dimensional optical sensor array, whose density is at least greater than or equal to the spatial frequency of the plural interference fringe. By controlling the travelling direction of the emitted light beam from the light source, the angle included by the surface of the reflective element and the light beam can be changed as a way to further control optical path difference. This design can enable the two-dimensional optical sensor array to comprehensively receive light information from an interference pattern.

The interferometer can further comprise an optical element, the optical element can be disposed between the light source and the photodetector. It is used in collimating and scattering light beam. Also, this optical element can comprise two lenses, wherein one lens is used in scattering the light beam, and the other leans is used in collimating the light beam. In addition, the optical element can be a Galilean assembly or a Keplerian assembly.

The interferometer can even comprise a spatial filter. By using a spatial filter, diffraction due to defects in optical element or dust in the air can be reduced, for the purpose of uniformly disturbing the intensity of the cross section of the light beam.

The reflective element can be a planar reflective mirror, preferably, the surface of the reflective element is further plated with a silver reflective layer, a gold reflective layer, or an aluminum reflective layer; the coated layer can be selected on the basis of the operating wavelength for interferometer.

In one embodiment of the current invention, the reflective element can halve the light beam into a first light beam and a second light beam that are substantially equivalent in terms of intensity.

The photodetector detects interferogram, and can convert the information related to spatial change in the interferogram into an electrical signal output, which can be used in subsequent analysis.

Another embodiment of the present invention provides a spectrometer, which comprises: an interferometer and an analyzer; the interferometer comprises: a light source configured to emit a light beam; a reflective element having a surface, wherein an angle $\theta$ is formed between a travelling direction of the light beam and the surface of the reflective element; and a photodetector, which is configured to be substantially perpendicular to the reflective element, and which is used in detecting light signals; wherein, by use of the reflective element, the light beam is halved into a first light beam travelling by the included angle $\theta$ and a second light beam reflected off the reflective element. The first light beam and the second light beam interfere each other to form an interferogram on the photodetector, the photodetector then detects the interferogram and converts the information about spatial change in the interferogram into an electrical signal output and sends it to an analyzer. The analyzer takes the information about spatial change in the interferogram P and performs a Fourier-transform calculation to provide a spectral distribution graph. The first light beam and the second light beam have an intersecting angle $\Phi$, which is basically $\phi=2\theta$.

As a result, the present embodiment provides a spectrometer needing no complication for moving around its parts, only requiring a few optical elements to produce an interferogram for more detailed analysis. This arrangement reduces the number of optical elements for a spectrometer, and ultimately keeps occupying volume to its minimal form.

The light beam used in this invention can be a monochromatic light beam, characterized by a certain wavelength $\lambda$, and the interferogram can comprise numerous interference fringes, which have a spatial frequency of $v_s=2 \sin \theta/\lambda$. On another level of managing these parameters, the angle included by the surface of the reflective element can be changed by controlling the light beam's propagation direction, and the spatial frequency of the multiple interference fringes can ultimately be controlled.

As well, the light beam can be a collimated light beam, a diverging light beam, or a converging light beam. Preferably, the light beam is a collimated light beam.

The photodetector can be a charge-coupled device (CCD) or a complementary metal oxide semiconductor (CMOS); it is preferred to be a charge-coupled device.

In addition, the photodetector can be an optical sensor array, preferably, the photodetector is a two-dimensional optical sensor array, whose density is at least greater than or equal to the spatial frequency of plural interference fringe. By controlling the travelling direction of the emitted light beam from the light source, the angle included by the surface of the reflective element and the light beam can be changed as a way to further control optical path difference. This design can enable the two-dimensional optical sensor array to comprehensively receive light information from an interference pattern.

The reflective element of the spectrometer can halve the light beam into a first light beam and a second light beam having substantially the same intensity.

LIST OF REFERENCE NUMERALS

1 Light Source
11 Light Beam
111 First Light Beam
112 Second Light Beam
2 Planar Reflective Mirror
21 Surface
3 Photodetector
4 Light Source
5 Light Beam
51 First Light Beam
52 Second Light Beam
60 Planar Reflective Mirror
601 Surface
61 Spatial Filter
62 Optical Element
621 Lens
622 Lens
7 Photodetector
8 Interferometer
9 Analyzer
$\theta$ Included Angle
$\Phi$ Intersecting Angle

DETAILED DESCRIPTION OF THE PREFERRED EMBODIMENT

Hereafter, examples will be provided to illustrate the embodiments of the present invention. Other advantages and effects of the invention will become more apparent from the disclosure of the present invention. Other various aspects also may be practiced or applied in the invention, and various modifications and variations can be made without departing from the spirit of the invention based on various concepts and applications.

In describing and claiming the present invention, the following terminology will be used in accordance with the definitions set forth below.

As used herein, the term "substantially" refers to the complete or near complete extent or degree of an action, characteristic, property, state, structure, item, or result. The exact allowable degree of deviation from absolute completeness may in some cases on the specific context. However, generally speaking the nearness of completion will be so as to have the same overall result as if absolute and total completion were obtained. The term "substantially" is equally applicable when used in a negative connotation to refer to the complete or near complete lack of an action, characteristic, property, state, structure, item, or result.

Embodiment 1

Figure 1:
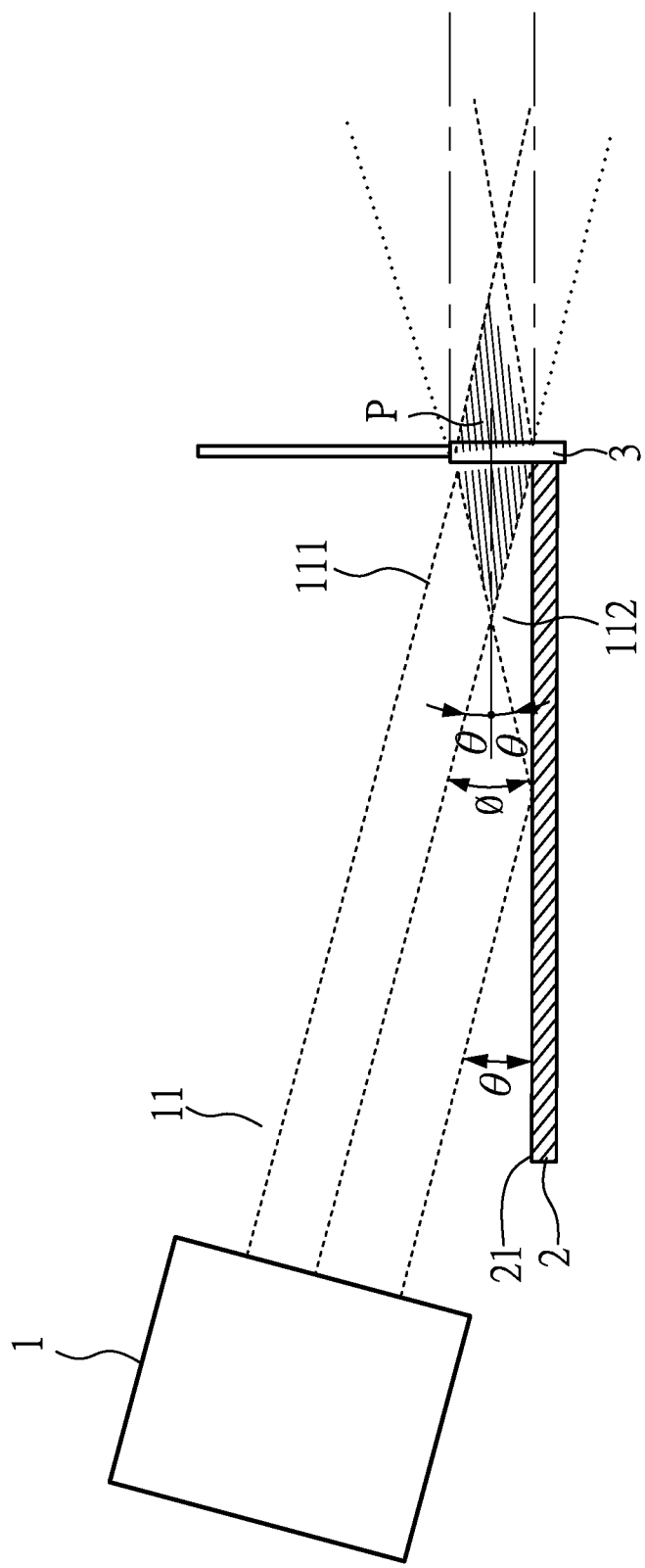
FIG. 1 is a perspective view of an interferometer for Embodiment 1 according to the present invention.

In reference to FIG. 1, a perspective view of an interferometer for Embodiment 1 according to the present invention is disclosed. First, as shown in FIG. 1, the interferometer comprises: a light source 1, a planar reflective mirror 2, and a photodetector 3. The light source 1 is configured to emit a light beam 11; the planar reflective mirror 2 has a surface 21, the travelling direction of the light beam 11 and the surface 21 of the planar reflective mirror 2 forms an included angel θ; and the photodetector 3 is substantially perpendicular to the planar reflective mirror 2, and is used in detecting light signal. The light beam 11 is halved by the planar reflective mirror 2 into a first light beam 111 that travels by the included angle θ and a second light beam 112 reflected off the surface 21 of the planar reflective mirror. The travelling direction of the second light beam 112 substantially forms an included angle θ with the surface 21 of the planar reflective mirror 2, and the first light beam 111 and the second light beam 112 intersect on the focal plane to form an interferogram P on the photodetector 3 (that is, photodetector 3 is located on the focal plane), and then the photodetector 3 detects the interferogram P; wherein the first light beam 111 and the second light beam 112 intersect an intersecting angle Φ, which is substantially Φ=2θ.

Here, the interferometer does not need to move any of its parts, but simply needs one reflective element to split the light beam to produce interference; accordingly, this can reduce the number of optical elements in the interferometer, and reduce the volume of the interferometer, while also driving down the production cost.

Also, the light beam 11 is a monochromatic light beam, which is defined by a specific wavelength λ, the interferogram P has multiple interference fringes, the spatial frequency of which is $v_s = 2 \sin \theta / \lambda$. In the current embodiment, the light beam 11 is a monochromatic light beam, wherein the specific wavelength λ is selected to be one within the near infrared range (which being 780 nm~2526 nm). Also, the surface 21 of the planar reflective mirror 2 is plated with a silver reflective layer (not shown in the drawing), which can make the light beam having a wavelength within the near infrared range to be effectively reflected. Also as a consequence of this, the first light beam 111 and the second light beam 112 have substantially the same intensity.

In addition, the light beam 11 can be a collimated light beam, which can also be a diverging light beam or a converging light beam, but adjustment for such device requires an additional optical element.

Next, the photodetector 3 is a charge-coupled device (CCD), and the photodetector 3 is designed to have a two-dimensional optical sensor array, the density of the two-dimensional optical sensor array is at least greater than or equal to the spatial frequency ($v_s = 2 \sin \theta / \lambda$) of numerous interference fringes. Accordingly, the present invention can control the travelling direction of the emitted light beam 11 from the light source 1 to change the included angle θ formed by the surface 21 of the planar reflective mirror 2 as a way to control optical path difference. This design can allow the photodetector 3 to completely receive light information of the interferogram P.

As a result, the photodetector 3 can detect the interferogram P, and can detect the information corresponding to spatial change of the interferogram P into an electrical signal output (not shown here). In the current embodiment, because the wavelength of the selected light beam 11 is within the near infrared range, the interferometer of the current embodiment can be applied effectively in the quantitative and qualitative analysis of food, matter composition, and petroleum.

Embodiment 2

Figure 2:
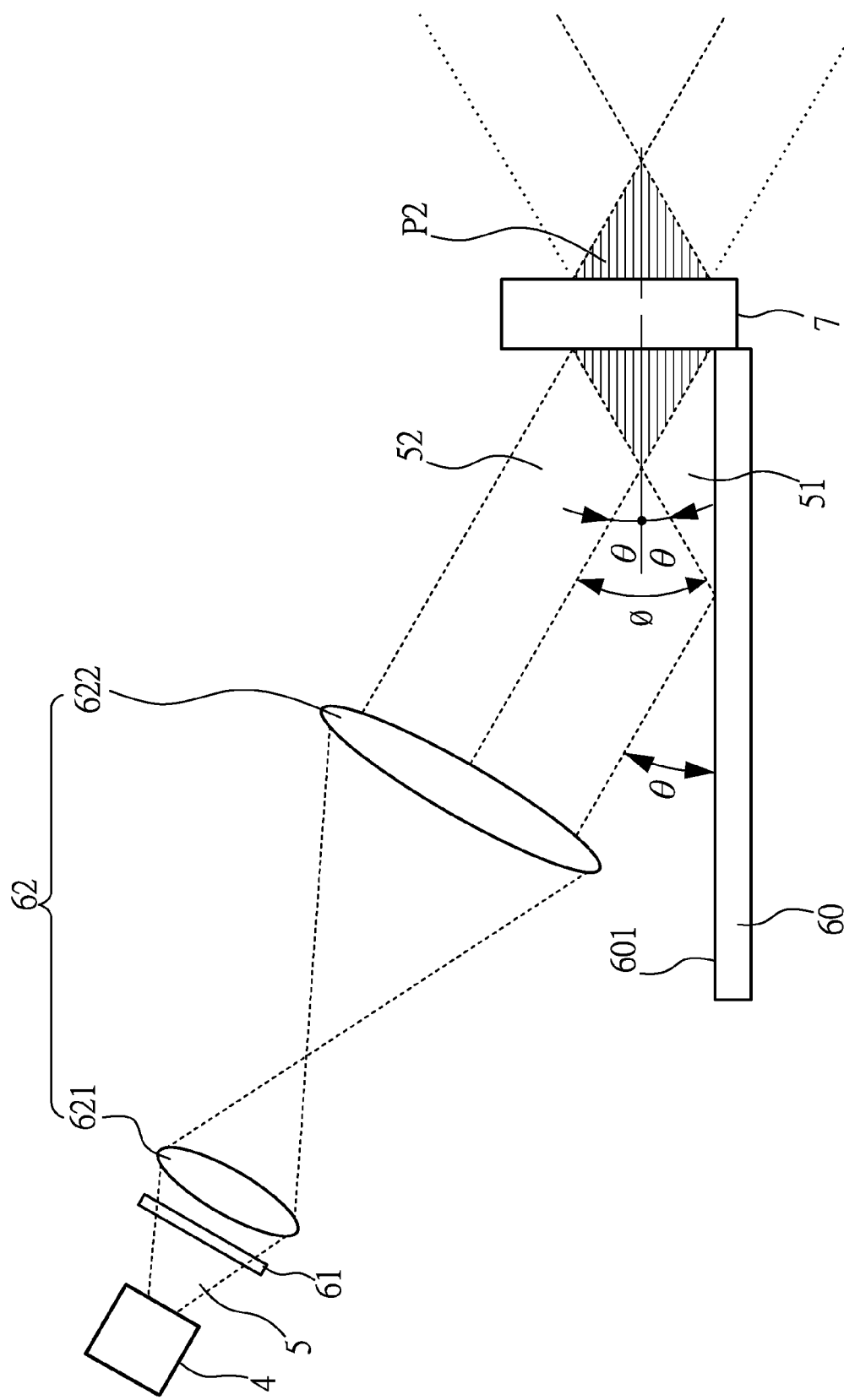
FIG. 2 is a perspective view of an interferometer for Embodiment 2 according to the present invention.

Referring now to FIG. 2, a perspective view on an interferometer of Embodiment 2 for the present invention is shown. As shown in the Figure, the interferometer comprises optical elements, which are: a light source 4, a spatial filter 61, an optical element 62, a planar reflective mirror 60, and a photodetector 7. The light source 4 is configured to emit a light beam 51, the light beam 51 is a diverging light beam; the spatial filter 61 is disposed in parallel to and in front of the light source 4. When the light beam 51 passes through the spatial filter 61, the spatial filter 61 can effectively screen out environmental noises to uneven the intensity of the cross section of the light beam. Optical element 62 comprises two lenses 621, 622, wherein one lens 622 is arranged in parallel to and in front of the spatial filter 61, and is configured to expand the light beam 5; the other lens 621 is used in between the spatial filter 61 and lens 622, and is designed to focus and collimate the diverging light beam 51. As such, after the light beam 51 passes through the spatial filter 61 and the two lenses 621, 622, the light beam 5 that is passed through the filter, expanded, and collimated would produce a light beam having excellent optical quality. The planar reflective mirror 60 has a surface 601, the travelling direction of the light beam 5 and the surface 601 of the planar reflective mirror form an included angle θ; the photodetector 7 is disposed to be substantially perpendicular to the planar reflective mirror 60, and is used in detecting light signal. The light beam 5 is halved by the planar reflective mirror 60 into a first light beam 51 travelling by the included angle θ and a second light beam 52 reflected off by the surface 601. The travelling direction of the second light beam 52 also substantially forms an included angle θ with the surface 601 of the planar reflective mirror 60. The first light beam 51 and the second light beam 52 also intersect on the focal plane to form an interferogram P2 on the photodetector 7 (the photodetector 7 is positioned on the focal plane), and then the photodetector 7 detects an interferogram P2; wherein the first light beam 51 and the second light beam 52 have an intersecting angle Φ, which is substantially Φ=2θ.

As a result, in the present embodiment, the interferometer is not limited to be equipped with merely one reflective element, but can also be equipped with different optical elements. Such a setup is believed to be particularly useful when the optical quality of the light beam emitted by the original light source is low, because this can provide additional filtering, expanding, and collimating, in order to achieve a clearer interferogram.

Embodiment 3

Figure 3:
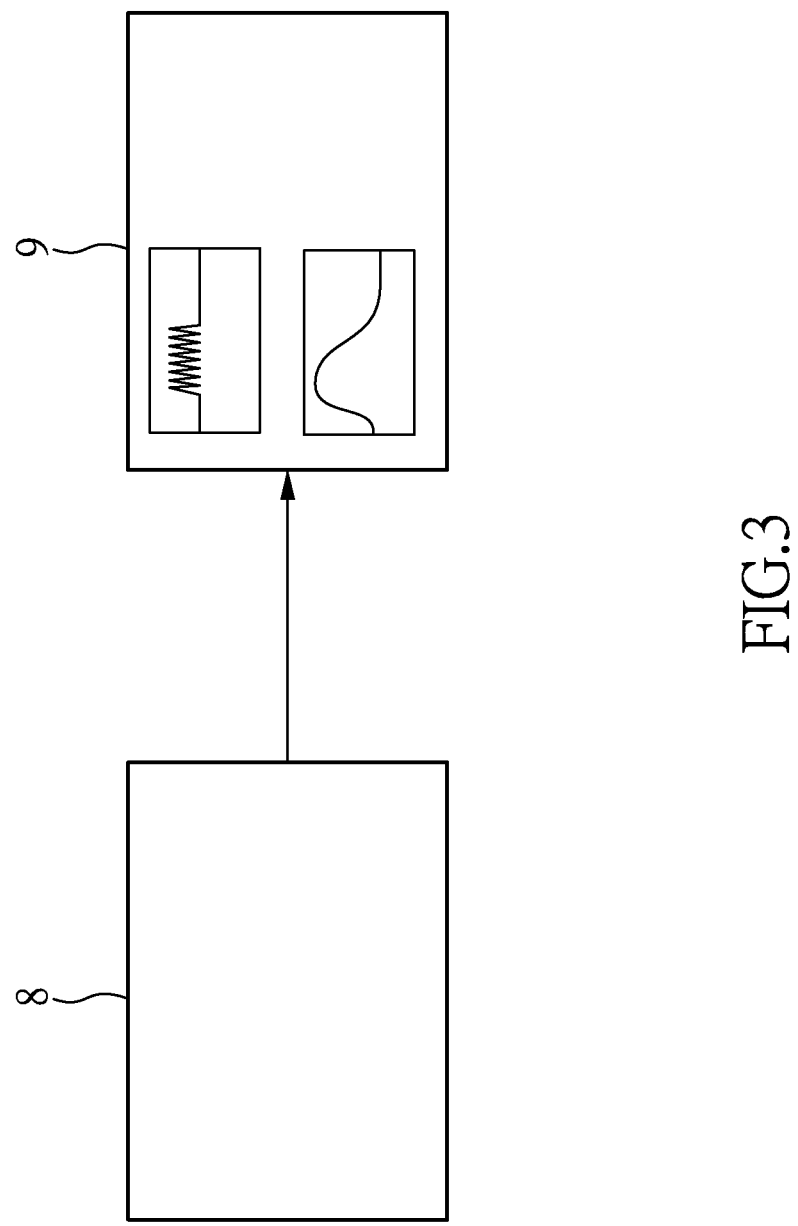
FIG. 3 is shows a spectrometer for Embodiment 3 according to the present invention.

In another embodiment of the current invention, disclosed herein in FIG. 3, a view of the spectrometer of Embodiment 1 for the current invention is shown. Please also refer to FIG. 1 for incorporation of reference. FIG. 3 discloses a spectrometer which comprises an interferometer 8 and an analyzer 9. The interferometer 8 in this case is the same as one shown in FIG. 1. The interferometer 8 comprises: a light source 1, a planar reflective mirror 2 and a photodetector 3. The light source 1 is configured to emit a light beam 11; the planar reflective mirror 2 has a surface 21, an angle is formed by inclusion between the travelling direction of the light beam 11 and the surface 21 of the planar reflective mirror 2; the photodetector 3 is disposed to be substantially perpendicular to the planar reflective mirror 2, and is used in detecting light signal. Wherein, the light beam 11 is halved by the planar reflective mirror 2 into a first light beam 11 travelling by an included angle θ and a second light beam 112 reflected off the surface 21, and the first light beam 111 and the second light beam 112 intersect at the focal plane to form an interferogram P on the photodetector 3 (the photodetector 3 is located on the focal plane). The photodetector 3 detects the interferogram P, and converts the information about the spatial change in the interferogram P into an electrical signal output, and sends the output to an analyzer 9. The analyzer operates to carry out a Fourier-transform calculation on the information about spatial change in the interferogram P to provide a spectral distribution graph (not shown here). The first light beam 111 and the second light beam 112 intersect at an intersecting angle θ, and the angle is substantially $\Phi=2\theta$.

By the above, it has been shown that the present invention is a spectrometer needing no repositioning of any movable parts to produce interference for detailed analysis; it requires only a reflective element to halve a light beam for the same effect. This design can reduce number of optical elements in a spectrometer, minimize the occupying volume of a spectrometer, and lower its production cost.

In the present embodiment, the analyzer 9 can be a computer, or a spectral analyzer. The interferometer 8 and the analyzer 9 can send out electrical signals with or without electrical conductors.

The above embodiments are for the purpose of better describing the current invention and are of exemplary nature only, the scope of right asserted by the current invention is based on the scope of claims in this application, and are not intended to be restricted by the above embodiments.

What is claimed is:

1. An interferometer, comprising:
a light source, which is configured to emit a light beam;
a reflective element having a surface, wherein the travelling direction of the light beam and the surface of the reflective element forms an included angle θ; and
a photodetector, which is configured to be substantially perpendicular to the reflective element, and is used in detecting a light signal;
wherein, the light beam is halved by the reflective element into a first light beam travelling by the included angle θ and a second light beam reflected off the surface of the reflective element, the first light beam and the second light beam intersect each other to form an interferogram on the photodetector, the photodetector detects the interferogram, the first light beam and the second light beam have an intersecting angle Φ between each other, and it is substantially $\Phi=2\theta$.

2. The interferometer of claim 1, wherein the light beam is a monochromatic light beam, the monochromatic light beam has a predetermined wavelength λ, and the interferogram P has a spatial frequency of $v_s=2\sin\theta/\lambda$.

3. The interferometer of claim 1 or 2, wherein the photodetector is a charge-coupled device (CCD), or a complementary metal oxide semiconductor (CMOS).

4. The interferometer of claim 1 or 2, wherein the photodetector is an optical sensor array.

5. The interferometer of claim 4, wherein the optical sensor array is a two-dimensional optical sensor array, the two-dimensional optical sensor array has a density at least greater than or equal to the spatial frequency of the plurality of interference fringe.

6. The interferometer of claim 1, wherein the light beam is a collimated light beam, a diverging light beam, or a converging light beam.

7. The interferometer of claim 1, further comprising an optical element, which is disposed between the light source and the photodetector, and used in collimating and expanding the light beam.

8. The interferometer of claim 7, wherein the optical element comprises two lenses.

9. The interferometer of claim 8, wherein the optical element uses a Galilean telescope setup, or a Keplerian telescope setup.

10. The interferometer of claim 1, further comprising a spatial filter.

11. The interferometer of claim 1, wherein the reflective element is a plane mirror.

12. The interferometer of claim 1, wherein the surface of the reflective element is plated with a silver reflective layer, a gold reflective layer, an aluminum reflective layer.

13. The interferometer of claim 1, wherein the first light beam and the second light have substantially the same intensity.

14. The interferometer of claim 1, wherein the photodetector detects the interferogram, and converts information about spatial change in the interferogram into an electrical signal output.

15. A spectrometer, comprising:
an interferometer; and
an analyzer, wherein the interferometer comprises:
a light source, which is configured to emit a light beam;
a reflective element, which has a surface that forms an angle θ with a direction to which the light beam travels; and
a photodetector, which is configured to be substantially perpendicular to the reflective element, and is used in detecting a light signal;
wherein, the light beam is halved by the reflective element into a first light beam travelling by the included angle θ and a second light beam reflected off the surface of the reflective element, the first light beam and the second light beam intersect each other to form an interferogram on the photodetector, the photodetector detects the interferogram and converts information about spatial change in the interferogram into an electrical signal output acceptable for the analyzer, the analyzer performs a Fourier-transform calculation based on the information about spatial change in the interferogram to provide a spectral distribution graph, the first light beam and the second light beam have an intersecting angle Φ between, and it is substantially $\Phi=2\theta$.

16. The spectrometer of claim 15, wherein the light beam is a monochromatic light beam, the monochromatic light beam has a predetermined wavelength λ, and the interferogram has a spatial frequency of $v_s=2\sin\theta/\lambda$.

17. The spectrometer of claim 16, wherein the photodetector is an optical sensor array.

18. The spectrometer of claim 17, wherein the optical sensor array is a two-dimensional optical sensor array, the two-dimensional optical sensor array has a density at least greater than or equal to the spatial frequency of the plurality of interference fringe.

19. The spectrometer of claim 15, wherein the light beam is a collimated light beam, a diverging light beam, or a converging light beam.

20. The spectrometer of claim 15, wherein the first light beam and the second light substantially have the same intensity.

* * * * *